United States Patent
Rangi et al.

(10) Patent No.: US 10,566,729 B2
(45) Date of Patent: Feb. 18, 2020

(54) METHOD OF MANUFACTURING A CONNECTOR WITH INTEGRAL TERMINAL POSITION ASSURANCE MECHANISM

(71) Applicant: Lear Corporation, Southfield, MI (US)

(72) Inventors: Bhupinder Rangi, Novi, MI (US); Lewis Galligan, Novi, MI (US); David Menzies, Linden, MI (US); Michael Glick, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/176,019

(22) Filed: Oct. 31, 2018

(65) Prior Publication Data

US 2019/0181580 A1 Jun. 13, 2019

Related U.S. Application Data

(62) Division of application No. 15/838,866, filed on Dec. 12, 2017, now abandoned.

(51) Int. Cl.
| | |
|---|---|
| *H01R 13/436* | (2006.01) |
| *B29C 45/14* | (2006.01) |
| *H01R 13/50* | (2006.01) |
| *H01R 43/18* | (2006.01) |
| *H01R 13/422* | (2006.01) |

(52) U.S. Cl.
CPC ......... *H01R 13/4368* (2013.01); *B29C 45/14* (2013.01); *H01R 13/4223* (2013.01); *H01R 13/4362* (2013.01); *H01R 13/4364* (2013.01); *H01R 13/501* (2013.01); *H01R 43/18* (2013.01)

(58) Field of Classification Search
CPC .............. H01R 13/4361; H01R 13/501; H01R 13/4223; H01R 13/4362
See application file for complete search history.

(56) References Cited

U.S. PATENT DOCUMENTS

| | | | | |
|---|---|---|---|---|
| 5,147,222 A | * | 9/1992 | Hotea | H01R 13/5205 439/589 |
| 5,316,504 A | * | 5/1994 | Jinno | H01R 13/4362 439/595 |
| 5,716,235 A | * | 2/1998 | Endo | H01R 13/436 439/596 |
| 5,967,843 A | * | 10/1999 | Okabe | H01R 13/501 439/596 |
| 6,000,967 A | * | 12/1999 | Norizuki | H01R 13/4362 439/596 |
| 6,027,374 A | * | 2/2000 | Nagai | H01R 13/4361 439/596 |
| 6,050,861 A | * | 4/2000 | Genta | H01R 13/4362 439/752 |
| 6,083,056 A | * | 7/2000 | Okabe | H01R 13/506 439/598 |
| 6,106,340 A | * | 8/2000 | Myer | H01R 13/4367 439/595 |

(Continued)

OTHER PUBLICATIONS

AFK/AFS Leaf Spring Connector Systems, (undated—admitted prior art), pp. 27-54.

*Primary Examiner* — Ross N Gushi
(74) *Attorney, Agent, or Firm* — MacMillan, Sobanski & Todd, LLC

(57) ABSTRACT

A method of manufacturing an electrical connector housing assembly includes a step of molding the electrical connector housing assembly with a cover in a pre-lock position.

10 Claims, 4 Drawing Sheets

(56) References Cited

U.S. PATENT DOCUMENTS

| | | | | |
|---|---|---|---|---|
| 6,116,954 | A * | 9/2000 | Ries | H01R 12/778 |
| | | | | 439/423 |
| 6,176,740 | B1 * | 1/2001 | Abe | H01R 13/4361 |
| | | | | 439/596 |
| 6,312,282 | B1 | 11/2001 | Blaha et al. | |
| 6,443,767 | B1 * | 9/2002 | Nagai | H01R 13/501 |
| | | | | 439/596 |
| 6,485,333 | B1 * | 11/2002 | Shinchi | H01R 13/504 |
| | | | | 439/587 |
| 6,780,070 | B2 * | 8/2004 | Ishikawa | H01R 13/4362 |
| | | | | 439/752 |
| 6,918,797 | B2 * | 7/2005 | Kashiyama | H01R 13/4362 |
| | | | | 439/752 |
| 7,004,791 | B2 * | 2/2006 | Mumper | H01R 43/18 |
| | | | | 439/595 |
| 7,026,559 | B2 | 4/2006 | James | |
| 7,086,910 | B2 * | 8/2006 | Tanaka | H01R 13/4362 |
| | | | | 439/752 |
| 7,387,545 | B2 | 6/2008 | Tyler et al. | |
| 7,563,135 | B2 * | 7/2009 | Takahashi | H01R 13/4362 |
| | | | | 439/488 |
| 8,951,066 | B2 | 2/2015 | Glick et al. | |
| 9,698,514 | B2 * | 7/2017 | Tanikawa | H01R 13/42 |
| 9,966,687 | B2 * | 5/2018 | Luthy | H01R 13/4361 |
| 2001/0051468 | A1 * | 12/2001 | Kashiyama | H01R 13/4362 |
| | | | | 439/752 |

* cited by examiner

METHOD OF MANUFACTURING A CONNECTOR WITH INTEGRAL TERMINAL POSITION ASSURANCE MECHANISM

CROSS-REFERENCE TO RELATED APPLICATIONS

This application is a divisional patent application of U.S. patent application Ser. No. 15/838,866, filed Dec. 12, 2017, the disclosure of which is incorporated herein by reference.

BACKGROUND

This invention relates generally to electrical connectors and, more particularly, to modular electrical connectors that include assurances that the terminal is fully seated within the connector in a position for contact with a mating terminal blade or pin.

Electrical connectors are commonly used in many manufacturing situations for easily making one or more connections between electrical conductors in various circuits. Electrical connectors typically include two portions, namely, a primary connector and secondary connector, either of which may be a circuit board or a molded connector. Generally, these electrical connectors take the form of either a pin or "male" connector portion and a mating receptacle or "female" connector portion. The two connector portions often include orientation key features that mandate connection in just one orientation to preserve polarities and/or proper circuit connections in multipole connectors. Connector position assurance (CPA) features may be used to lock the connector portions together to prevent loosening of the connector.

Electrical connectors are typically molded from plastic materials and have metallic electrically-conductive contacts or terminals inserted into them. In a primary connector, one end of the terminal is connected to a circuit or load, often (but not always) by means of a wire conductor, while the other end is designed to maintain contact with the corresponding terminal of a secondary connector.

Terminal position assurance (TPA) is recognized in the industry for insuring that electrical terminals are fully seated within a molded connector and will not "back out," which can result in poor or no electrical conductivity. TPA devices are exemplified, for example, in U.S. Pat. Nos. 7,387,545 and 8,951,066, both of which describe TPA components that are distinct and separate pieces from the connector body and that have to be (1) inserted or otherwise manipulated into the pre-lock position prior to use, and (2) further manipulated into the lock position during use, which is a two-step process.

It would be advantageous to provide improved electrical connectors with integral TPA features that facilitate manufacture.

SUMMARY OF THE INVENTION

One aspect of this invention provides an improved electrical connector housing assembly comprising:

a body defining one or more elongated receptacles for receiving terminal contacts therein, the elongated receptacle defining a longitudinal axis of the body; and a cover integral with and cantilevered from the body so as to hinge along an axis transverse to the longitudinal axis between a pre-lock position, in which the cover is spaced apart from a first surface of the body, and a lock position, in which the cover is adjacent the first surface of the body;

the body further defining (a) an aperture through the first surface and into the receptacle; and (b) first and second protrusions on a side surface of the body adjacent the first surface, the first and second protrusions defining a generally longitudinal groove along the side of the body; and the cover further including (c) a stop tab projecting from the cover toward the first surface and positioned to extend through the aperture in the first surface when the cover is in the lock position, thereby providing an abutment face within the receptacle for retaining a contact terminal; and (d) one or more arms extending from the cover in the direction of the first surface along the side surface, each of the arms having a latch tab that rests in contact with the second protrusion on the side surface when the cover is in the lock position, and between the first and second protrusions on the side surface when the cover is in the pre-lock position.

In certain embodiments, the cover is restrained against rotation about the hinge in the pre-lock position until sufficient force is applied to force the latch tab past the second protrusion and into the lock position.

In certain embodiments, the body of the electrical connector housing assembly is substantially in the shape of a hyperrectangle or cuboid having two side surfaces substantially orthogonal to the first surface. In certain embodiments, the body defines two sets of first and second protrusions or rails, one set on each side of the body, and the cover further defines two arms, each extending laterally from the cover in opposing directions and directionally toward the first surface along each side surface of the body. In some embodiments, the second protrusion and/or the latch tab may include an abutment surface for retaining the latch tab in the lock position once it engaged. The body may also define orientation key features or connector position assurance features, or both.

In certain embodiments, the aperture may be a simple hole, but in other embodiments, it may be an elongated slot aligned with the longitudinal axis. Likewise, in certain embodiments, the stop tab may be a simple pin or peg, but in other embodiments, it may be an elongated longitudinal rib. It is to be understood that the aperture will be of a size and shape to accommodate receiving the stop tab as the cover is closed to the lock position. The stop tab may further include an abutment face at or near a distal end for retaining the terminal contact against backing movement in the proximal direction.

In certain embodiments, the housing body and cover are molded as an integral piece with a living hinge. In some embodiments, the housing body and cover may be molded as an integral piece, with the latch tabs disposed between the first and second protrusions in the pre-lock position. This may be achieved by employing inserts or cores that extend longitudinally into the mold cavity from both the proximal and distal ends.

In another aspect, the application relates to a method of using the electrical connector housing assembly, comprising:

inserting a conductive contact terminal into a receptacle from the proximal end of the housing assembly without first having to place the assembly in a "pre-lock" position;

seating the terminal against a terminal stop at a distal end of the receptacle; and closing the cover to engage the latch tabs with the second protrusion to establish a "lock" position, thereby forcing the abutment face against the terminal to prevent movement proximally.

The housing assembly described herein has a number of advantageous features. First, it can be molded directly in the pre-lock position with the latch tabs disposed within the groove between the protrusion rails. This simplifies manufacturing processes because the normally required step of putting the TPA in the pre-lock position is avoided. Secondly, the living hinge is protected from damage because it is not easily folded back too far, which might cause it to weaken or break.

In another aspect, this application relates to a method of manufacturing the electrical connector housing assembly, comprising molding the electrical connector housing assembly with the cover in the pre-lock position.

In another aspect, this application relates to a method of manufacturing an electrical connector housing assembly including:

a body defining one or more elongated receptacles for receiving terminal contacts therein, the elongated receptacles defining a longitudinal axis of the body;

a cover integral with the body and having a hinge along an axis transverse to the longitudinal axis and a terminal position assurance feature configured to retain a terminal contact in the receptacle, the cover having a lock position, in which the cover is retained against rotation about the hinge and the terminal position assurance feature is located to retain a terminal contact in the receptacle, and a pre-lock position, in which the cover is retained against rotation about the hinge without the terminal position assurance feature located to retain a terminal contact in the receptacle;

the method including the step of molding the electrical connector housing assembly with the cover in the pre-lock position.

Other advantages and features are evident from the following detailed description.

DESCRIPTION OF THE DRAWINGS

The accompanying drawings, incorporated herein and forming a part of the specification, illustrate this invention in its several aspects and, together with the description, serve to explain the principles of the invention. In the drawings, the thickness of the lines, layers, and regions may be exaggerated for clarity.

FIGS. 1 through 4 show the electrical connector in an open or "pre-lock" position ready for closure, wherein FIG. 1 is a perspective view; FIG. 2 is a side elevational view; FIG. 4 is a partially cut-away view showing an electrical conductor inserted into the connector.

FIGS. 5 and 6 show the electrical connector in a closed or "lock" position with the electrical conductor inserted to terminal position and securely held there, wherein FIG. 5 is a perspective view; and FIG. 6 is partially cut-away view.

Figure 1:
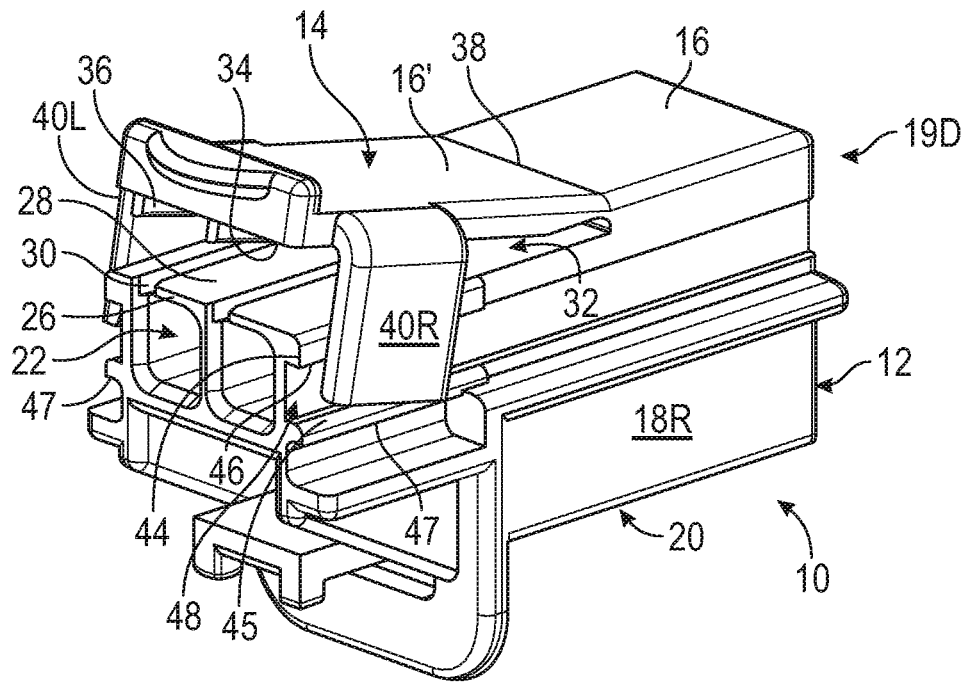

Various aspects of this invention will become apparent to those skilled in the art from the following detailed description of the preferred embodiment, when read in light of the accompanying drawings.

DETAILED DESCRIPTION

Unless defined otherwise, all technical and scientific terms used herein have the same meaning as commonly understood by one of ordinary skill in the art to which the invention belongs. All references identified by citation herein, including books, journal articles, published U.S. or foreign patent applications, issued U.S. or foreign patents, and any other citations, are each incorporated by reference in their entireties, including all data, tables, figures, and text presented in the cited references.

Numerical ranges, measurements, and parameters used to characterize the invention (for example, angular degrees, quantities of ingredients, physical dimensions and so forth) are necessarily approximations and, while reported as precisely as possible, they inherently contain imprecision derived from their respective measurements. Consequently, all numbers expressing ranges of magnitudes as used in the specification and claims are to be understood as being modified in all instances by the term "about." All numerical ranges are understood to include all possible incremental sub-ranges within the outer boundaries of the range. Thus, a range of thirty to ninety units discloses, for example, thirty-five to fifty units, forty-five to eighty-five units, and forty to eighty units, etc. Unless otherwise defined, percentages are wt/wt %.

Directions, orientations, and positions of components relative to one another may be described in terms with reference to the orientation of the device shown in the drawing figures. As such, a first component may be "on top" of a second component, or extend "downwardly" from a second component, or may contact a surface "beneath" a second component, but such terms are to be understood only with reference to the drawing figures and do not limit the invention in a real, three-dimensional world in which the device may take an orientation other than the one depicted in the drawings.

Other directions, positions, and orientations are defined relative to elements of the device. For example, the "longitudinal" axis is defined relative to the elongated receptacles for the terminals. In embodiments shown in the figures, this happens to correspond to the long dimension of the housing body, but this is not necessarily the case. In larger, multipole connectors, the body may have a long dimension that is transverse to the longitudinal axis. Similarly, the orientations "proximal" and "distal" are defined with respect to the conductors that will eventually occupy the receptacles in a connector housing, such that the conductor is inserted into and trails from the proximal end, while the distal end is in contact with and has features for mating with the secondary connector.

Figure 7:
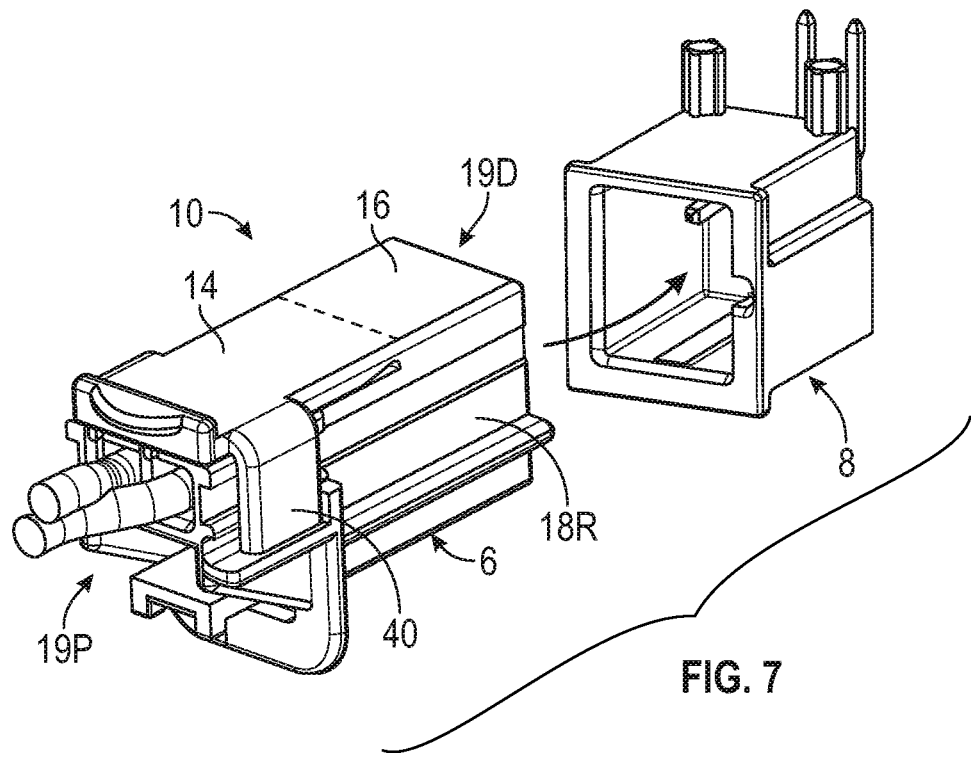
FIG. 7 shows the connector in position for mating with a secondary connector.

As mentioned and depicted schematically in FIG. 7, electrical connectors typically include two portions, namely, a primary connector 6 and a secondary connector 8. Either may be of the pin or male-type, or of the receptacle or female-type, and either may be a molded "plug"-type or a circuit board or other electrical interface. However, for purposes of this application, at least one portion is a molded housing assembly 10 and this is referred to herein as the "primary connector."

Figure 2:
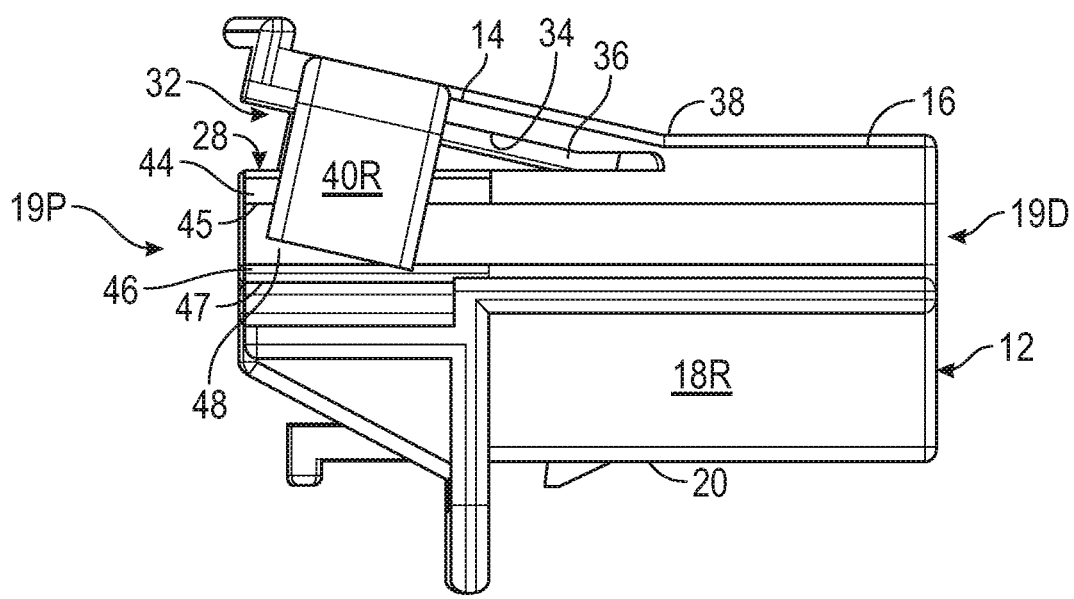
Figure 3A:
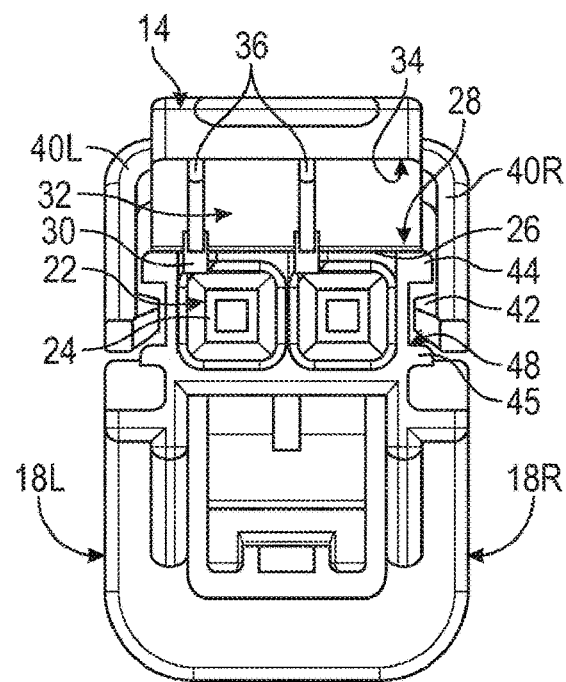
FIG. 3A is an end elevational view.
Figure 3B:
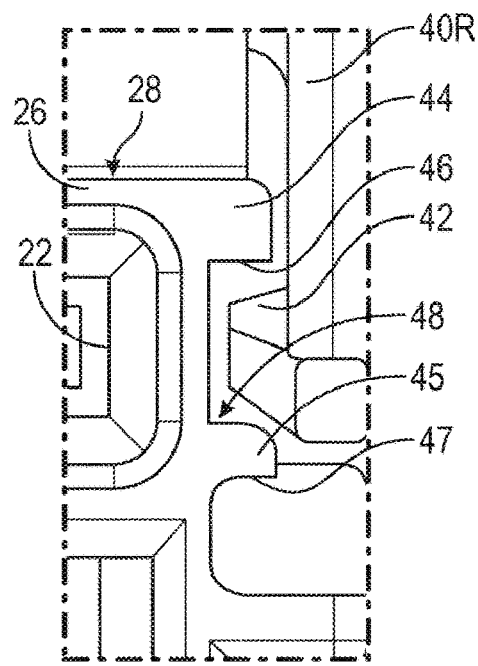
FIG. 3B is an enlargement of a portion of FIG. 3A.
Figure 4:
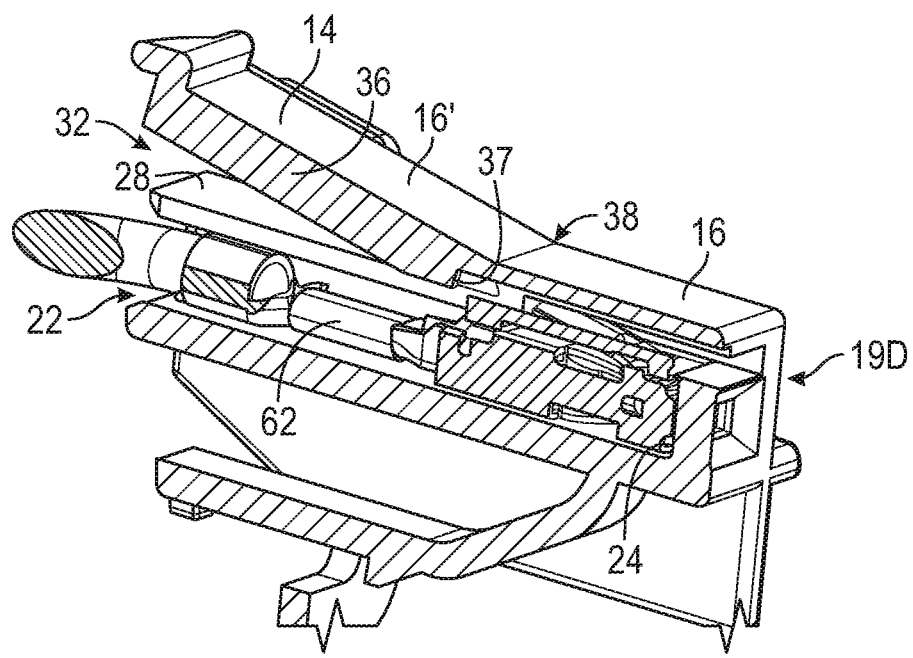

Referring to FIGS. 1 through 3, a connector housing assembly 10 is shown having a body 12 and an integral cover 14. The body 12 is generally in the shape of a hyperrectangle or rectangular cuboid having a substantially planar surface or top 16, two sides 18R, 18L, a bottom 20, a proximal end 19P, and a distal end 19D. The sides 18R and 18L are generally orthogonal to the top 16 (see FIG. 3) and to the proximal and distal ends 19P and 19D (see FIG. 2), but this is not a strict requirement. The body 12 forms receptacles 22 (two shown) that define the longitudinal axis. As best shown in FIG. 4, the receptacles 22 are elongated for each receiving an electrical terminal 62. Accordingly, the receptacles 22 are fully open at the proximal end 19P, but terminal stops 24 at the distal end of the receptacle 22 prevent the electrical terminals 62 from being inserted beyond the distal end 19D.

The receptacles 22 may have any cross-sectional shape, but are shown having square cross-sectional shapes in the figures. The cross-sectional shapes facilitate the fit of "leaf-spring" type terminals that have blades biased together for good contact with pin or blade terminals in the secondary connector. Other terminal shapes may warrant other receptacle cross-sectional shapes to accommodate the specific configuration of the terminal. Alternative receptacle cross-sectional shapes may include, for example, triangles, rectangles, circles, ovals, hexagons, octagons, etc.

A thin wall 26 separates the receptacles 22 from a first surface 28 toward the exterior of body 12. The wall 26 and its first surface 28 include a slot or aperture 30 therethrough that is generally aligned with the longitudinal axis. In the illustrated embodiment, the aperture 30 is an elongated slot that extends in length from a medial hinge area (discussed below) to the proximal end 19P of the body 12. In other embodiments, however, the aperture 30 may not originate at the hinge area and may not extend to the proximal end 19P of the body 12. Rather, it may be a longitudinal slot of lesser length or a simple aperture of round, oval, or other shape, provided the aperture is dimensioned to receive a stop tab 36 of the cover 14 (discussed below).

Figure 5:
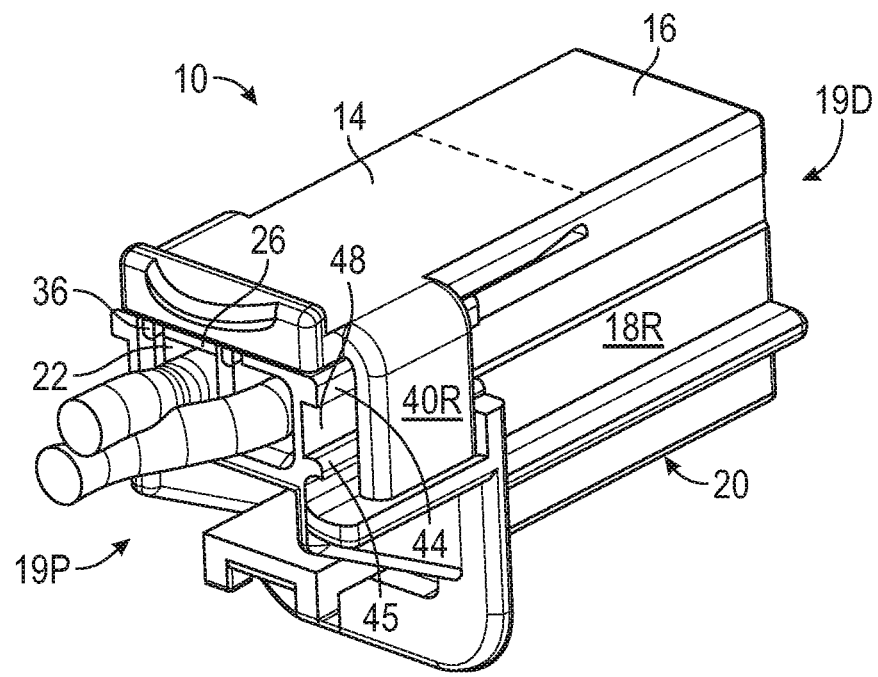
Figure 6:
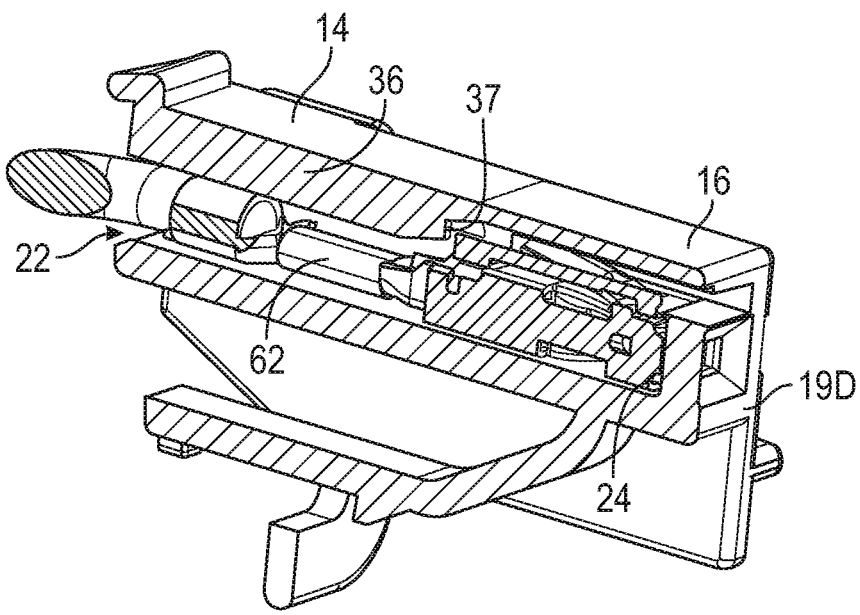

The cover 14 is a generally flat, planar extension of top 16, having an upper surface 16' and a bottom surface 34. The cover 14 is integral with body 12, but is separate and cantilevered therefrom via a living hinge 38 in a medial hinge area of the body 12. The cover 14 is designed to exist in an open or "pre-lock" position as seen in FIGS. 1-3, in which there is a space or gap 32 between the first surface 28 of the body 12 and bottom surface 34 of the cover 14. The cover 14 is also designed to exist in a closed or "lock" position as seen in FIGS. 5 and 6, in which the first surface 28 of the body 12 and bottom surface 34 of the cover 14 are in contact, or nearly in contact. The cover 14 closes the gap 32 in the "lock" position.

From the bottom surface 34 of the cover 14, the stop tabs 36 extend downwardly in the direction of the first surface 28. In the illustrated embodiment, the stop tab 36 is an elongated rib that extends in length from approximately the hinge area 38 to the proximal end 19P of the cover 14. In other embodiments, however, the stop tab 36 may be a shorter longitudinal rib or a simple tab of round, oval, or other shape, provided the stop tab 36 and its corresponding aperture 30 are dimensioned with sufficient tolerance to allow the aperture 30 to receive stop tab 36 as the cover 14 is pivoted from "pre-lock" to "lock" positions.

The function of the stop tab 36 is best illustrated in FIG. 6. The stop tab 36 includes an abutment face 37 that extends into the receptacle 22 when the cover 14 is in the "lock" position to prevent the electrical terminal 62 from backing out the proximal end 19P of the housing 10. The abutment faces 37 of the stop tabs 36 may be at or near the distal end 19D of each rib. The electrical terminal 62 itself may provide a corresponding face or edge for abutting the abutment face 37.

In operation, the electrical terminal 62 is inserted into the receptacle 22 at the proximal end 19P of the terminal housing assembly 10 while the cover 14 is in the "pre-lock" position. The electrical terminal 62 is pushed in as far as the terminal stops 24 permit. The cover 14 is then closed to the "lock" position such that the stop tabs 36 are moved through slots or apertures 30 and extend into the receptacles 22, with one of the abutment faces 37 holding the electrical terminal 62 in its fully seated position by preventing backing movement.

Extending from the cover 14 in a generally downwardly direction toward the first surface 28 along each side 18R, 18L of the body 12 are arms 40R, 40L. In the illustrated embodiment shown, the arms 40R, 40L originate near the proximal end 19P of the cover 14 (away from the hinge area 38) and extend laterally a short distance approximately equal to the thickness of the arms 40R, 40L in order to clear the sides 18R, 18L. The arms 40R, 40L then extend downwardly along the sides 18R, 18L. At the outer end of these arms 40R, 40L are latch tabs 42 that extend back toward the body 12. Although arms 40R, 40L are shown on both sides 18R, 18L of the body 12 in the illustrated embodiment, it is within the scope of this invention to employ just one such arm 40R, 40L on one side or the other. Additionally, it is within the scope of this invention to employ more than one pair of arms 40R, 40L extending from the cover 14, perhaps as many as two pairs. In this case, a first pair of arms 40R, 40L would be located at or near the proximal end 19P, and a second pair 40R, 40L would be located midway between the hinge area 38 and the proximal end 19P. The width of the arms 40R, 40L and their associated latch tabs 42 is a matter of design choice, but generally will range from about one-eighth to one-half the length of the cover 14.

The body 12 also includes a pair of rails 44 and 45 on each side surface 18R, 18L toward the proximal end 19P. An upper or first rail 44 is located on each side surface 18R, 18L near the first surface 28, while a lower or second rail 45 is located more medially on each side surface 18R, 18L. The illustrated rails 44 and 45 are elongated. The lengths of the rails 44 and 45 may be approximately as long as the widths of the latch tabs 42 and up to about twice this width. Each rail 44 and 45 may have on its lower side a backcut or lip 46, 47 that serves to better resist movement of the latch tabs 42 past the lips 46, 47. The latch tabs 42 may also have firm upper lips to further resist movement past the respective rails 44 and 45.

Each of the second rails 45 is oriented generally parallel to the longitudinal axis, but this is simply because the latch tabs 42 on the arms 40R, 40L are generally parallel to the longitudinal axis when in the "lock" positions. In the more general case, the second rails 45 should be approximately aligned with the latch tabs 42 (at whatever the angle) when the assembly is in the "lock" position. Analogously, each of the first rails 44 should be approximately aligned with the latch tabs 42 (at whatever the angle) when the assembly is in the "pre-lock" position. Alternatively, as shown in the figures, the first rails 44 and the second rails 45 may be aligned with one another. In all cases, the first rails 44 and the second rails 45 define respective grooves 48 in which the latch tabs 42 are retained, stably holding the cover 14 in the "pre-lock" position.

The connector housing assembly 10 according to the invention provides several unique manufacturing and industrial advantages. First, it may be integrally molded as just one part, in contrast to prior art TPA systems that typically required two or more parts. Second, it can be manufactured with the cover in the "pre-lock" position as molded. This avoids a manufacturing step in which the TPA must be set to its "pre-lock" position prior to use. Because the grooves 48 stably retain the cover 14 in the "pre-lock" position, it may be shipped in this condition without fear of it inadvertently closing to the "lock" position or swinging further open to risk damage or breaking of the hinge 38.

The connector housing assembly 10 may be manufactured of known plastic materials using standard injection molding techniques. In general, two halves of a mold define a cavity into which a plastic resin is injected. Straight-pull molds are generally preferred for ease of use. Design features, such as backcuts, ridges, bosses, and lips, may be formed by proper draft angles. Alternatively, backcuts, lips and orifices may be defined by cores or inserts that are carefully positioned within the mold cavity, being moved into position and extracted either along the line of mold extraction or transverse to the line of extraction. Such cores or inserts may be automatically moved into place or inserted and removed by hand.

Plastic resins for part molding are well known. A few examples include nylon, polypropylene, polyethylene (including a variety of density grades known as LLDPE, LDPE, and HDPE), and polystyrene, including PS and HIP polystyrene.

The foregoing description of the various aspects and embodiments of this invention has been presented for purposes of illustration and description. It is not intended to be exhaustive of all embodiments or to limit the invention to the specific aspects disclosed. Obvious modifications or variations are possible in light of the above teachings, and such modifications and variations fall within the scope of the invention as determined by the appended claims when interpreted in accordance with the breadth to which they are fairly, legally, and equitably entitled.

What is claimed is:

1. A method of manufacturing a housing assembly for an electrical connector comprising the step of molding as an integral piece of material a body and a cover that are connected together by a hinge, wherein:
   (1) the body has a receptacle provided therein that is adapted to receive an electrical terminal;
   (2) the body has first and second rails provided thereon;
   (3) the cover has a stop tab provided thereon; and
   (4) the cover is movable between a pre-lock position and a lock position relative to the body, wherein:
      (a) when the cover is in the pre-lock position, a portion of the cover cooperates with the first and second rails to retain the cover in the pre-lock position, and the stop tab is not positioned to prevent removal of an electrical terminal disposed within the receptacle of the body;
      (b) when the cover is in the lock position, the portion of the cover cooperates with only one of the first and second rails to retain the cover in the lock position, and the stop tab is positioned to prevent removal of an electrical terminal disposed within the receptacle of the body; and
      (c) the body and the cover are molded with the cover being located in the pre-lock position.

2. The method defined in claim 1 wherein the body has a plurality of receptacles provided therein adapted to receive respective electrical terminals, and the cover has a corresponding plurality of stop tabs provided thereon that are not positioned to prevent removal of the electrical terminals disposed within the receptacles of the body when the cover is in pre-lock position and are positioned to prevent removal of the electric terminals disposed within the receptacles of the body when the cover is in the lock position.

3. The method defined in claim 1 wherein the body and the cover are connected together by a living hinge.

4. The method defined in claim 1 wherein the cover has an arm extending therefrom, the arm of the cover cooperates with the first and second rails to retain the cover in the pre-lock position, and the arm of the cover cooperates with only one of the first and second rails to retain the cover in the lock position.

5. The method defined in claim 1 wherein the body has two pairs of first and second rails provided thereon, respective portions of the cover cooperate with the two pairs of first and second rails to retain the cover in the pre-lock position, and the respective portions of the cover cooperate with respective ones of the two pairs of first and second rails to retain the cover in the lock position.

6. A method of manufacturing an electrical connector comprising the steps of:
   (A) molding a housing assembly as an integral piece of material a body and a cover that are connected together by a hinge, wherein:
      (1) the body has a receptacle provided therein that is adapted to receive an electrical terminal;
      (2) the body has first and second rails provided thereon;
      (3) the cover has a stop tab provided thereon; and
      (4) the cover is movable between a pre-lock position and a lock position relative to the body, wherein:
         (a) when the cover is in the pre-lock position, a portion of the cover cooperates with the first and second rails to retain the cover in the pre-lock position, and the stop tab is not positioned to prevent removal of an electrical terminal disposed within the receptacle of the body;
         (b) when the cover is in the lock position, the portion of the cover cooperates with only one of the first and second rails to retain the cover in the lock position, and the stop tab is positioned to prevent removal of an electrical terminal disposed within the receptacle of the body; and
         (c) the body and the cover are molded with the cover being located in the pre-lock position;
   (B) when the cover is in pre-lock position, inserting and electrical terminal within the receptacle the body; and
   (C) moving the cover from the pre-lock position to the lock position.

7. The method defined in claim 6 wherein the body has a plurality of receptacles provided therein that receive respective electrical terminals, and the cover has a corresponding plurality of stop tabs provided thereon that are not positioned to prevent removal of the electrical terminals disposed within the receptacles of the body when the cover is in pre-lock position and are positioned to prevent removal of the electric terminals disposed within the receptacles of the body when the cover is in the lock position.

8. The method defined in claim 6 wherein the body and the cover are connected together by a living hinge.

9. The method defined in claim 6 wherein the cover has an arm extending therefrom, the arm of the cover cooperates with the first and second rails to retain the cover in the pre-lock position, and the arm of the cover cooperates with only one of the first and second rails to retain the cover in the lock position.

10. The method defined in claim 6 wherein the body has two pairs of first and second rails provided thereon, respective portions of the cover cooperate with the two pairs of first and second rails to retain the cover in the pre-lock position, and the respective portions of the cover cooperate with respective ones of the two pairs of first and second rails to retain the cover in the lock position.

* * * * *